(12) United States Patent
Ma et al.

(10) Patent No.: US 11,796,170 B2
(45) Date of Patent: Oct. 24, 2023

(54) HEAT EXCHANGE TUBE OF WASTE HEAT BOILER

(71) Applicant: ZHEJIANG UNIVERSITY, Hangzhou (CN)

(72) Inventors: Zengyi Ma, Hangzhou (CN); Jianhua Yan, Hangzhou (CN); Yike Zhang, Hangzhou (CN); Wenhan Li, Hangzhou (CN); Ruofeng Gao, Hangzhou (CN); Zhe Chen, Hangzhou (CN); Yaming Cai, Hangzhou (CN); Pucheng Zhong, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/723,408

(22) Filed: Apr. 18, 2022

(65) Prior Publication Data
US 2022/0243908 A1  Aug. 4, 2022

Related U.S. Application Data

(63) Continuation of application No. PCT/CN2020/113594, filed on Sep. 4, 2020.

(30) Foreign Application Priority Data

Oct. 18, 2019 (CN) .......................... 201910993860.2

(51) Int. Cl.
*C23C 22/08* (2006.01)
*C23C 22/74* (2006.01)
(Continued)

(52) U.S. Cl.
CPC ............ *F22B 37/025* (2013.01); *F22B 37/04* (2013.01); *F22B 37/06* (2013.01)

(58) Field of Classification Search
CPC ............ F28F 13/12; F16L 58/14; F22B 37/04
See application file for complete search history.

(56) References Cited

U.S. PATENT DOCUMENTS

| 948,741 A | * | 2/1910 | Pielock | ................... F28F 13/12 138/38 |
| 5,666,942 A | * | 9/1997 | Kazen | ................... F23M 9/003 126/307 R |

FOREIGN PATENT DOCUMENTS

| CN | 1768245 A | * | 5/2006 | ............. F28F 13/04 |
| CN | 107922270 A | * | 4/2018 | ............. C03C 17/22 |

(Continued)

OTHER PUBLICATIONS

CN-108467974-A and translation (Year: 2018).*

(Continued)

*Primary Examiner* — Steven S Anderson, II

(57) ABSTRACT

Disclosed is a heat exchange tube of waste heat boiler, which includes a tube body. The outer surface of the tube body is sprayed with a layer of anti-corrosion coating. The components of the anti-corrosion coating are $Al_2O_3$, $CaAl_2O_4$ and $Ca_3(PO_4)_2$. On the surface of nano anti-corrosion coating, HF reacts with $Al_2O_3$, $CaAl_2O_4$ and $Ca_3(PO_4)_2$ to form $AlF_3$ and $Ca_5(PO_4)_3F$, which are tightly wrapped on the surface of the coating, thereby effectively preventing HF from corroding the interior of the coating and the heat exchange tube. Meanwhile, due to the anti-corrosion coating with the specific composition of the present disclosure, the heat exchange tube of the present disclosure can be resistant to fluorine corrosion at a high temperature of 600° C. or more, and can be used at a rather high temperature of 1000° C. or more.

13 Claims, 2 Drawing Sheets

(51) Int. Cl.
*F16L 58/14* (2006.01)
*F22B 37/02* (2006.01)
*F22B 37/04* (2006.01)
*F22B 37/06* (2006.01)

(56) References Cited

FOREIGN PATENT DOCUMENTS

| CN | 108467974 A | * | 8/2018 | |
| CN | 108467974 A | | 8/2018 | |
| CN | 109554062 A | * | 4/2019 | ........... C09D 123/06 |
| CN | 109943106 A | | 6/2019 | |
| JP | S60164168 A | * | 8/1985 | |

OTHER PUBLICATIONS

CN-109554062-A and translation (Year: 2019).*
JP-S60164168-A and translation (Year: 1985).*
CN-1768245-A and translation (Year: 2006).*
CN-107922270-A and translation (Year: 2018).*
International Search Report issued in corresponding International application No. PCT/CN2020/113594, dated Dec. 7, 2020.
Written Opinion of the International Searching Authority for No. PCT/CN2020/113594.

* cited by examiner

HEAT EXCHANGE TUBE OF WASTE HEAT BOILER

CROSS REFERENCE OF RELATED APPLICATIONS

The present application claims priority of International Patent Application No. PCT/CN2020/113594, filed on Sep. 4, 2020, which claims priority of Chinese Patent Application No. 201910993860.2, filed on Sep. 4, 2019, the entire contents of which are hereby incorporated by reference.

TECHNICAL FIELD

The present disclosure relates to the technical field of anti-corrosion of waste heat boilers, and in particular to a waste heat boiler heat exchange tube resistant to high fluorine flue gas corrosion.

BACKGROUND

In China, fluorine chemical industry started in the 1950s and 1960s. After more than 60 years of rapid development, China has become the world's largest producer and exporter of basic fluorine chemical products. In the production process of fluorine chemicals, such as product dehydrogenation, refining and other processes, organic waste liquids and waste residues such as fluorine-containing organic compounds with high boiling point will be generated. The fluorine content in these wastes reaches more than 1%, and the highest is more than 50%. Fluorinated organic wastes are chemically stable due to the presence of fluorine, and a considerable part of them are persistent bioaccumulative toxic substances that are not easily degradable. These wastes have high toxicity, corrosiveness, persistence, bioaccumulation and long-distance migration, causing the "three causes" of organisms, namely cause of disability, cause of teratogenicity, and cause of mutagenesis, and they have long-term, latent and irreversible harm to the ecological environment and human health. Therefore, China has listed the solid wastes produced by these fluorine chemical industries in the "National List of Hazardous Wastes".

Incineration, as an oxidative combustion reaction at high temperature, can decompose combustible organic matter at high temperature, and has the advantage of causing large weight loss. However, during the incineration of high-fluorine hazardous waste, the high-temperature flue gas generated contains high concentration of HF, which will cause serious corrosion to the heat exchange surface of the waste heat boiler and affect the safe operation of the waste heat boiler. In the "Technical specifications for Centralized Incineration Facility" (HJ/T176-2005), General Requirements for Hazardous Waste Disposal System 6.1.3 stipulates that "for the incineration system for hazardous wastes with high fluorine content or more than 5% chlorine content, shall not use waste heat boiler to cool down . . . ". This is contrary to the national policy of continuously deepening energy conservation and emission reduction. Therefore, how to overcome the technical problem of fluorine corrosion in the process of waste heat utilization of high fluorine-containing solid waste incineration, and recover the heat of the flue gas and generate steam to realize energy recovery and utilization, while reducing the temperature of the flue gas and reducing the water used in the quenching tower. There is a great significance to the long-term development of the fluorine chemical industry.

At present, the method of coating a layer of fluoroplastic film on the surface of the heat exchange tube is generally adopted for the fluorine corrosion-resistant heat exchange tube. However, because the fluoroplastic film is unstable at high temperature, it can generally only be used under the working condition of 300° C., which limits the application range of the heat exchange tube.

SUMMARY

The present disclosure provides a heat exchange tube of a waste heat boiler, which is resistant to high fluorine flue gas corrosion, and can resist fluorine corrosion at a high temperature of 600° C. or more, and can be used at a high temperature of 1000° C. or more.

A heat exchange tube of a waste heat boiler includes a tube body, the outer surface of the tube body is sprayed with a layer of anti-corrosion coating, the components of the anti-corrosion coating are $Al_2O_3$, $CaAl_2O_4$ and $Ca_3(PO_4)_2$.

The tube body may be an ordinary heat exchange tube body, such as 3087 carbon steel tube.

Optionally, the respective proportions of the $Al_2O_3$, the $CaAl_2O_4$ and the $Ca_3(PO_4)_2$ in the anti-corrosion coating are respectively 80% to 90%, 5% to 10% and 5% to 10%.

Optionally, the anti-corrosion coating has a thickness of 1 to 2 mm.

Optionally, the ingredients of the anti-corrosion coating comprise nano-alumina, calcium aluminate, calcium phosphate, nano-aluminum powder and nano-alumina sol.

The particle size range of the nano-alumina is 10 to 30 nm; the particle size of the nano-aluminum powder is 20 to 100 nm; the solid content of the nano-alumina sol is 20 to 25%, the particle size is 10 to 15 nm, and the pH value is 4 to 5; calcium aluminate and calcium phosphate purity is equal to or greater than 99%; the five ingredients are commercially available.

Optionally, a ratio of the ingredients in parts by mass, is: 40 to 50 parts of nano-alumina, 5 to 10 parts of calcium aluminate, 5 to 10 parts of calcium phosphate, 20 to 30 parts of nano-aluminum powder; and 10 to 20 parts of nano-alumina sol is added into a mixture of the ingredients and evenly dispersed.

The product formed by alumina, calcium aluminate and calcium phosphate reacted with HF, wrap the surface of the coating, thereby prevent further corrosion of HF; nano-aluminum powder plays a role in enhancing the strength and toughness of the coating; nano-alumina sol mainly plays a role in dispersing uniform effect.

Optionally, the anti-corrosion coating is formed by a method including:

pretreating an outer surface of a tube body by sandblasting;

spraying a mixture of the alumina sol and a uniform mixture of the ingredients on the outer surface of the heat exchange tube pretreated by sandblasting;

forming the anti-corrosion coating on the outer surface of the tube body by leveling and low-temperature baking.

Optionally, the baking temperature is ranged from 200 to 300° C.

Optionally, the annular ribs are provided on an inner wall of the tube body.

Optionally, the annular ribs are mounted on the inner surface of the tube body by support columns, and the support columns penetrates all the annular ribs in sequence.

Compared with the prior art, the present disclosure at least has the following beneficial effects:

(1) The chemical composition of nano-alumina anti-corrosion coating includes Al2O3, CaAl$_2$O$_4$ and Ca3(PO4)2. On the surface of the nano anti-corrosion coating, HF reacts with Al2O3, CaAl2O4 and Ca3(PO4)2 to form AlF3 and Ca5(PO4)3F, which are tightly wrapped on the surface of the coating, thereby effectively preventing HF from corroding the interior of the coating and the heat exchange tube.
(2) Meanwhile, due to the anti-corrosion coating with the specific composition of the present disclosure, the heat exchange tube of the present disclosure can be resistant to fluorine corrosion at a high temperature of 600° C. or more, and can be used at a rather high temperature of 1000° C. or more.
(3) The heat exchange tube of the waste heat boiler with high fluorine flue gas corrosion resistance adopts an annular rib structure, which enhances the fluid disturbance heat exchange in the tube.

| 1-heat exchange tube of the waste heat boiler | 2-annular rib | 3-support column |
|---|---|---|
| 11-tube body | 12-anti-corrosion coating | |

DESCRIPTION OF THE EMBODIMENTS

In the following, the technical solutions in the embodiments of the present disclosure will be clearly and completely described with reference to the drawings in the embodiments of the present disclosure. Obviously, the described embodiments are only a part of the embodiments of the present disclosure, but not all of the embodiments. Based on the embodiments of the present disclosure, all other embodiments obtained by an ordinary person of skill in the art without creative efforts shall fall within the scope of protection of the present disclosure.

It should be noted that when a component is referred to as being "connected" to another component, it can be directly connected to the other component or an intervening component may also exist. When a component is considered to be "arranged on" another component, it may be directly arranged on the other component or there may be a co-existing centered component.

Unless otherwise defined, all technical and scientific terms used herein have the same meaning as commonly understood by one of ordinary skill in the art to which this invention belongs. The terms used herein in the description of the present disclosure are for the purpose of describing specific embodiments only, and are not intended to limit the present disclosure. As used herein, the term "and/or" includes any and all combinations of one or more of the associated listed items.

Figure 1:
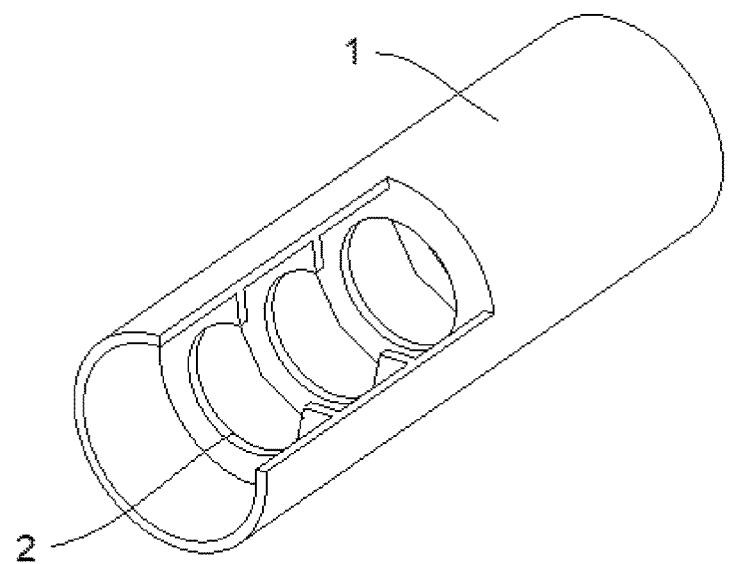
FIG. 1 is a schematic structural view of the result of the heat exchange tube of the present disclosure.
Figure 2:
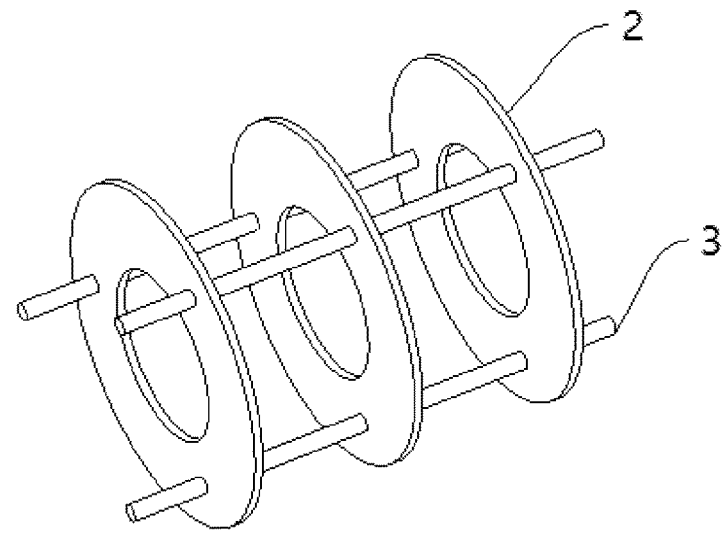
FIG. 2 is a schematic structural view of the annular ribs of the heat exchange tube of the present disclosure.
Figure 3:
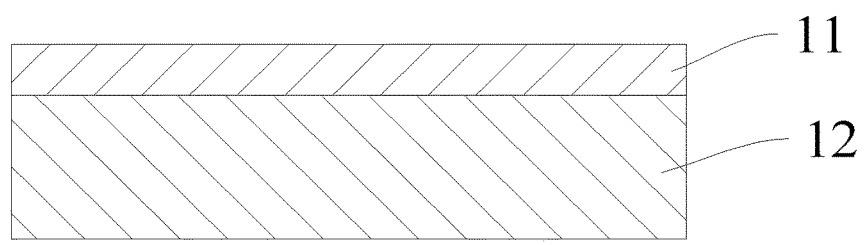
FIG. 3 shows a structure of the tube wall of the heat exchange tube of the present disclosure.
Figure 4:
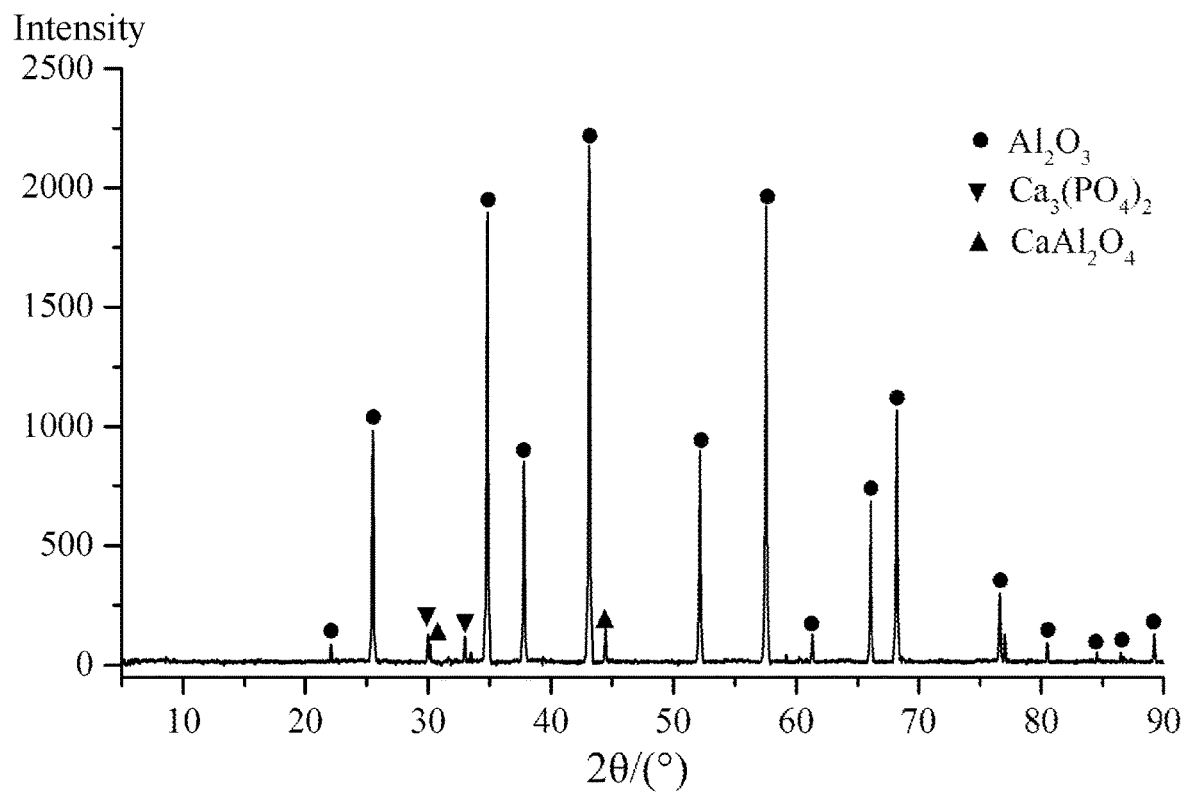
FIG. 4 is the XRD qualitative composition analysis diagram of the composition of the anti-corrosion coating.
Figure 5:
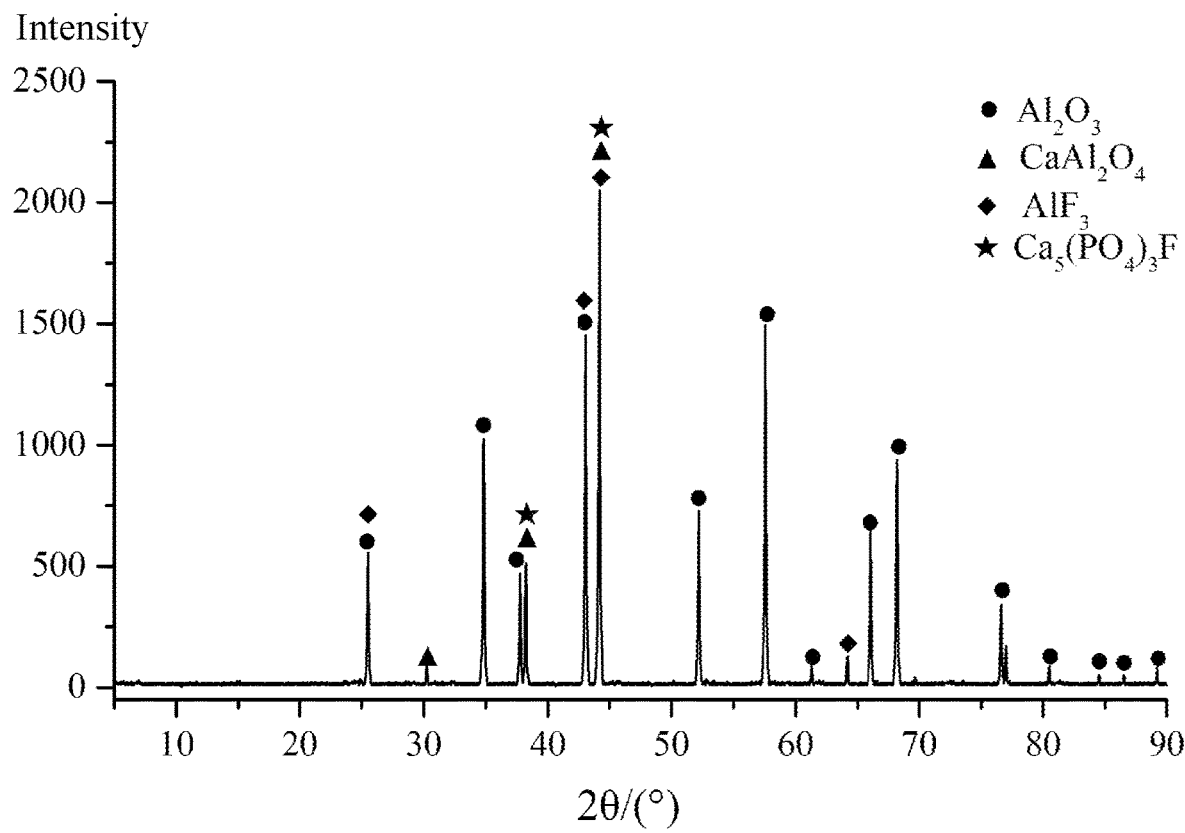
FIG. 5 is the composition analysis diagram (XRD) of the anti-corrosion coating after HF flue gas corrosion.
The reference numbers shown in the figures are as follows.

As shown in FIG. 1, in one embodiment, the heat exchange tube 1 of the waste heat boiler includes a tube body 12 and an anti-corrosion coating 11 on the surface of the tube body. The composition analysis (qualitative) result of the anti-corrosion coating is shown in FIG. 4, which shows the chemical components of the anti-corrosion coating include $Al_2O_3$, $CaAl_2O_4$ and $Ca_3(PO_4)_2$. After calculation, the proportions (ratio by mass) of $Al_2O_3$, $CaAl_2O_4$ and $Ca_3(PO_4)_2$ are 80-90%, 5-10% and 5-10%, respectively. The thickness of the anti-corrosion coating is 1~2 mm.

The tube body 12 may be any one of conventional heat exchange tube bodies, such as 3087 carbon steel tube.

In another embodiment, an annular rib structure is provided on the inner wall of the tube, the annular rib structure includes annular ribs 2 and support columns 3, the annular ribs are arranged coaxially with the tube body, and the radial width of the solid portion of the annular rib (i.e. the distance between the inner and outer rings) is 4-6 mm.

Example 1

The nano-alumina anti-corrosion coating 12 includes the following five ingredients: nano-alumina, calcium aluminate, calcium phosphate, nano-aluminum powder and nano-alumina sol. The nano-alumina has an average particle size of 20 nm and a purity that is equal to or greater than 99.9%. The average particle size of the nano-aluminum powder is 50 nm. The average particle size of the nano-alumina sol is 10-15 nm, the solid content is 25%, and the pH value is 4. The purity of the calcium aluminate and calcium phosphate is equal to or greater than 99%. The ingredients are commercially available.

The nano-alumina anti-corrosion coating includes the following components in parts by mass: 50 parts of nano-alumina, 5 parts of calcium aluminate, 5 parts of calcium phosphate, and 20 parts of nano-aluminum powder. 20 parts of nano-alumina sol were added to the coating ingredients mixed in proportion, and ground in a ball mill for 2 hours to obtain a homogeneous phase mixture. The homogeneous phase mixture is sprayed on the outer surface of the heat exchange tube pretreated by sandblasting, and after leveling and low temperature (300° C.) baking, a nanometer anti-corrosion coating 3 having a thickness of 2 mm is formed on the outer surface of the heat exchange tube 1.

After calculation, in the heat exchange tube prepared in this example, the proportions (ratio by mass) of $Al_2O_3$, $CaAl_2O_4$ and $Ca_3(PO_4)_2$ are 90%, 5% and 5%, respectively.

Example 2

The nano-alumina anti-corrosion coating 12 includes the following five ingredients: nano-alumina, calcium aluminate, calcium phosphate, nano-aluminum powder and nano-alumina sol. The nano-alumina has an average particle size of 20 nm and a purity that is equal to or greater than 99.9%. The average particle size of the nano-aluminum powder is 50 nm. The particle size of the nano-alumina sol is 10-15 nm, the solid content is 25%, and the pH value is 4. The purity of the calcium aluminate and calcium phosphate is equal to or greater than 99%.

The nano-alumina anti-corrosion coating is composed of the following components in parts by mass: 40 parts of nano-alumina, 10 parts of calcium aluminate, 10 parts of calcium phosphate, and 30 parts of nano-aluminum powder.

10 parts of nano-alumina sol were added to the mixed ingredients of coating in proportion, and ground in a ball mill for 2 hours to obtain a homogeneous phase mixture. The homogeneous phase mixture is sprayed on the outer surface of the heat exchange tube 1 pretreated by sandblasting, and after leveling and low temperature (300° C.) baking, a nanometer anti-corrosion coating 12 having a thickness of 2 mm is formed on the outer surface of the heat exchange tube 1.

After calculation, in the heat exchange tube prepared in this example, the proportions (ratio by mass) of $Al_2O_3$, $CaAl_2O_4$ and $Ca_3(PO_4)_2$ are 83.2%, 8.4% and 8.4%, respectively.

Application Example

The nano anti-corrosion coatings prepared according to the methods in the above examples 1 and 2 greatly enhance the strength and toughness of the anti-corrosion coatings due to the nano-alumina particles, nano-aluminum powder and nano-alumina sol in the raw materials. The heat exchange tube coated with the nano anti-corrosion coating was placed in the flue gas with a temperature of 600° C. and a HF content of 3000 mg/L. After maintaining for two months, the heat exchange tube was not corroded. The test of the composition of the nano anti-corrosion coating is shown in the accompanying figure. HF reacts with $Al_2O_3$, $CaAl_2O_4$ and $Ca_3(PO_4)2$ to form $AlF_3$ and $Ca_4(PO_4)_3F$, which are tightly wrapped on the surface of the coating, thereby effectively preventing HF from corroding the interior of the coating and the heat exchange tube.

The technical features of the above-described embodiments can be combined arbitrarily. In order to simplify the description, all possible combinations of the technical features in the above-described embodiments are not described. However, as long as there is no contradiction between the combinations of these technical features, all should be regarded as the scope described in this specification. When the technical features of different embodiments are embodied in the same figure, it can be considered that the figure also discloses the combination examples of the various embodiments involved.

The above-mentioned embodiments only represent several embodiments of the present disclosure, and the descriptions thereof are more specific and detailed, but should not be construed as a limitation on the scope of the invention patent. It should be pointed out that for those skilled in the art, without departing from the concept of the present disclosure, several modifications and improvements can be made, which all belong to the protection scope of the present disclosure. Therefore, the protection scope of the patent of the present disclosure should be subject to the appended claims.

What is claimed is:

1. A heat exchange tube of waste heat boiler, comprising a tube body, wherein an outer surface of the tube body is sprayed with a layer of anti-corrosion coating, components of the anti-corrosion coating are $Al_2O_3$, $CaAl_2O_4$ and $Ca_3(PO_4)_2$;

wherein ingredients of the anti-corrosion coating comprise nano-alumina, calcium aluminate, calcium phosphate, nano-aluminum powder and nano-alumina sol; and wherein a ratio of the ingredients in parts by mass, is: 40 to 50 parts of nano-alumina, 5 to 10 parts of calcium aluminate, 5 to 10 parts of calcium phosphate, 20 to 30 parts of nano-aluminum powder; and 10 to 20 parts of nano-alumina sol are added into a mixture of the ingredients and evenly dispersed.

2. The heat exchange tube of waste heat boiler according to claim 1, wherein respective proportions of the $Al_2O_3$, the $CaAl_2O_4$ and the $Ca_3(PO_4)_2$ in the anti-corrosion coating are respectively 80% to 90%, 5% to 10% and 5% to 10%.

3. The heat exchange tube of waste heat boiler according to claim 1, wherein the anti-corrosion coating has a thickness of 1 to 2 mm.

4. The heat exchange tube of waste heat boiler according to claim 1, wherein the anti-corrosion coating is formed by a method comprising:

pretreating an outer surface of the tube body by sandblasting;

spraying a mixture of the alumina sol and a uniform mixture of the ingredients on the outer surface of the heat exchange tube pretreated by sandblasting; and forming the anti-corrosion coating on the outer surface of the tube body by leveling and low-temperature baking.

5. The heat exchange tube of waste heat boiler according to claim 4, wherein a baking temperature is ranged from 200 to 300° C.

6. The heat exchange tube of waste heat boiler according to claim 1, wherein a plurality of annular ribs are provided on an inner wall of the tube body.

7. The heat exchange tube of waste heat boiler according to claim 6, wherein the annular ribs are mounted on an inner surface of the tube body by a plurality of support columns, and the support columns penetrate all the annular ribs in sequence.

8. The heat exchange tube of waste heat boiler according to claim 1, wherein a particle size range of the nano-alumina is 10 to 30 nm.

9. The heat exchange tube of waste heat boiler according to claim 1, wherein a particle size range of the nano-aluminum powder is 20 to 100 nm.

10. The heat exchange tube of waste heat boiler according to claim 1, wherein a solid content of the nano-alumina sol is 20% to 25%.

11. The heat exchange tube of waste heat boiler according to claim 1, wherein a particle size of the nano-alumina sol is 10 to 15 nm.

12. The heat exchange tube of waste heat boiler according to claim 1, wherein a pH value of the nano-alumina sol is 4 to 5.

13. The heat exchange tube of waste heat boiler according to claim 1, wherein calcium aluminate and calcium phosphate purity is equal to or greater than 99%.

* * * * *